(12) United States Patent
Lin

(10) Patent No.: US 9,980,613 B2
(45) Date of Patent: May 29, 2018

(54) CUTTING BOARD WITH INTEGRATED KNIFE SHARPENER

(71) Applicant: Lifetime Brands, Inc., Garden City, NY (US)

(72) Inventor: Hsin-Jung Lin, Forest Hills, NY (US)

(73) Assignee: Lifetime Brands, Inc., Garden City, NY (US)

( * ) Notice: Subject to any disclaimer, the term of this patent is extended or adjusted under 35 U.S.C. 154(b) by 160 days.

(21) Appl. No.: 14/800,055

(22) Filed: Jul. 15, 2015

(65) Prior Publication Data
US 2017/0014001 A1    Jan. 19, 2017

(51) Int. Cl.
*A47J 47/00* (2006.01)
*B24D 15/08* (2006.01)

(52) U.S. Cl.
CPC .......... *A47J 47/005* (2013.01); *B24D 15/081* (2013.01)

(58) Field of Classification Search
CPC .................. A47J 47/005; B24D 15/081; B24D 15/06–15/08; Y10T 83/9488
USPC ....................................... 269/89 R
See application file for complete search history.

(56) References Cited

U.S. PATENT DOCUMENTS

| | | | |
|---|---|---|---|
| 272,549 A * | 2/1883 | Hill | A23N 4/04 99/556 |
| 2,436,810 A * | 3/1948 | Jones | B24D 15/082 76/87 |
| 2,866,556 A * | 12/1958 | Hinz | A47J 47/005 210/498 |
| 2,935,107 A * | 5/1960 | Bertelsen | A47J 47/005 269/13 |
| 3,034,264 A * | 5/1962 | McMaster | B24B 3/54 451/241 |
| 3,680,441 A * | 8/1972 | Parker, Sr. | B23C 3/12 409/294 |
| 4,259,815 A * | 4/1981 | Kuban | B24D 15/08 451/552 |
| 4,811,642 A * | 3/1989 | Sorbie | B26D 1/30 83/574 |
| 4,907,789 A * | 3/1990 | Tice | A47J 47/005 269/13 |
| 4,912,885 A * | 4/1990 | Bonapace | B24D 15/081 451/45 |

(Continued)

OTHER PUBLICATIONS

International Search Report and Written Opinion issued in International Application No. PCT/US2016/038895 dated Oct. 24, 2016.

*Primary Examiner* — Joseph J Hail
*Assistant Examiner* — Henry Hong
(74) *Attorney, Agent, or Firm* — Tutunjian & Bitetto, P.C.

(57) ABSTRACT

A cutting board with integrated knife sharpener includes an opening in the cutting board configured to integrate the knife sharpener. The knife sharpener has a first folded down storage position and a second upright operable position. In the first folded down position, the sharpener is substantially flush with the surface of the cutting board. In the second upright operable position, the sharpener extends upward from the board opening, thus allowing access to the blade receiving slot therein. A securing mechanism is cooperatively integrated into both the board opening and sharpener to secure the same in both the first folded storage and second upright operable positions.

18 Claims, 11 Drawing Sheets

(56) References Cited

U.S. PATENT DOCUMENTS

| | | | | |
|---|---|---|---|---|
| 5,233,793 A * | 8/1993 | Dandurand | A47J 47/005 | 451/461 |
| 5,322,001 A * | 6/1994 | Boda | B23D 35/008 | 83/455 |
| D348,374 S * | 7/1994 | Dandurand | D7/698 | |
| D348,591 S * | 7/1994 | Willis | D7/673 | |
| 5,386,978 A * | 2/1995 | Ladwig | A47J 47/005 | 269/289 R |
| 5,440,953 A * | 8/1995 | Gangelhoff | B24D 15/081 | 451/486 |
| 5,582,535 A * | 12/1996 | Friel | B24D 15/068 | 451/321 |
| 5,904,271 A * | 5/1999 | Collins | A47J 47/005 | 222/143 |
| 6,101,898 A * | 8/2000 | Gore | B24D 15/065 | 76/82 |
| D458,812 S * | 6/2002 | Wong | D7/698 | |
| 6,726,552 B2 * | 4/2004 | Wilczynski | B24D 15/08 | 451/349 |
| D492,166 S * | 6/2004 | Kaposi | D7/698 | |
| 7,172,500 B1 * | 2/2007 | Wu | B24D 15/081 | 451/319 |
| 7,258,289 B1 * | 8/2007 | Butt | A47J 47/005 | 241/100 |
| 7,287,445 B2 * | 10/2007 | Friel, Sr. | B24B 3/54 | 451/349 |
| D630,914 S * | 1/2011 | Aviles | D7/698 | |
| 8,267,750 B2 * | 9/2012 | Friel, Sr. | B24D 15/08 | 451/349 |
| 8,342,915 B1 * | 1/2013 | Vogel | A47J 47/005 | 269/289 R |
| 8,430,387 B2 | 4/2013 | Roser | | |
| 8,721,403 B2 * | 5/2014 | Welch | A47G 21/14 | 206/553 |
| 8,951,098 B2 * | 2/2015 | Jhones | B24D 15/081 | 451/45 |
| D745,345 S * | 12/2015 | Joseph | D7/698 | |
| 2002/0096814 A1 * | 7/2002 | Wong | A47J 47/005 | 269/289 R |
| 2003/0139126 A1 * | 7/2003 | Harden | B24D 15/081 | 451/486 |
| 2003/0193123 A1 * | 10/2003 | Heath | A47J 47/005 | 269/289 R |
| 2004/0229554 A1 * | 11/2004 | Kaposi | A47J 47/005 | 451/319 |
| 2005/0221751 A1 * | 10/2005 | Lawson | A22C 25/06 | 452/195 |
| 2008/0041757 A1 * | 2/2008 | Nelson | A47G 21/14 | 206/553 |
| 2008/0296823 A1 * | 12/2008 | Pourounidis | A47J 47/005 | 269/289 R |
| 2009/0033012 A1 * | 2/2009 | Correa | A47J 47/005 | 269/13 |
| 2009/0166943 A1 * | 7/2009 | Raschkov | A47J 47/005 | 269/290 |
| 2009/0275272 A1 * | 11/2009 | Bonapace | B24D 15/082 | 451/321 |
| 2009/0322004 A1 * | 12/2009 | Young | A47J 47/005 | 269/15 |
| 2011/0095465 A1 * | 4/2011 | Vlahos | A47J 47/005 | 269/16 |
| 2011/0133383 A1 * | 6/2011 | Roser | B26B 29/06 | 269/290 |
| 2011/0221111 A1 * | 9/2011 | Stigall | A47J 47/005 | 269/9 |
| 2011/0221112 A1 * | 9/2011 | Kent | A47J 47/005 | 269/15 |
| 2012/0153554 A1 * | 6/2012 | Ito | A47J 47/005 | 269/289 R |
| 2012/0261327 A1 * | 10/2012 | Bagley | A47J 47/005 | 210/238 |
| 2012/0261871 A1 * | 10/2012 | Kaufmann | A47J 47/005 | 269/16 |
| 2013/0214466 A1 * | 8/2013 | Young | A47J 47/005 | 269/14 |
| 2013/0306500 A1 * | 11/2013 | Barber | B24D 15/084 | 206/223 |
| 2014/0038504 A1 * | 2/2014 | Cozzini | B24D 15/081 | 451/555 |
| 2014/0225320 A1 * | 8/2014 | Gotsis | A47J 47/005 | 269/14 |
| 2015/0257608 A1 * | 9/2015 | Torlai | A47J 47/005 | 269/15 |

* cited by examiner

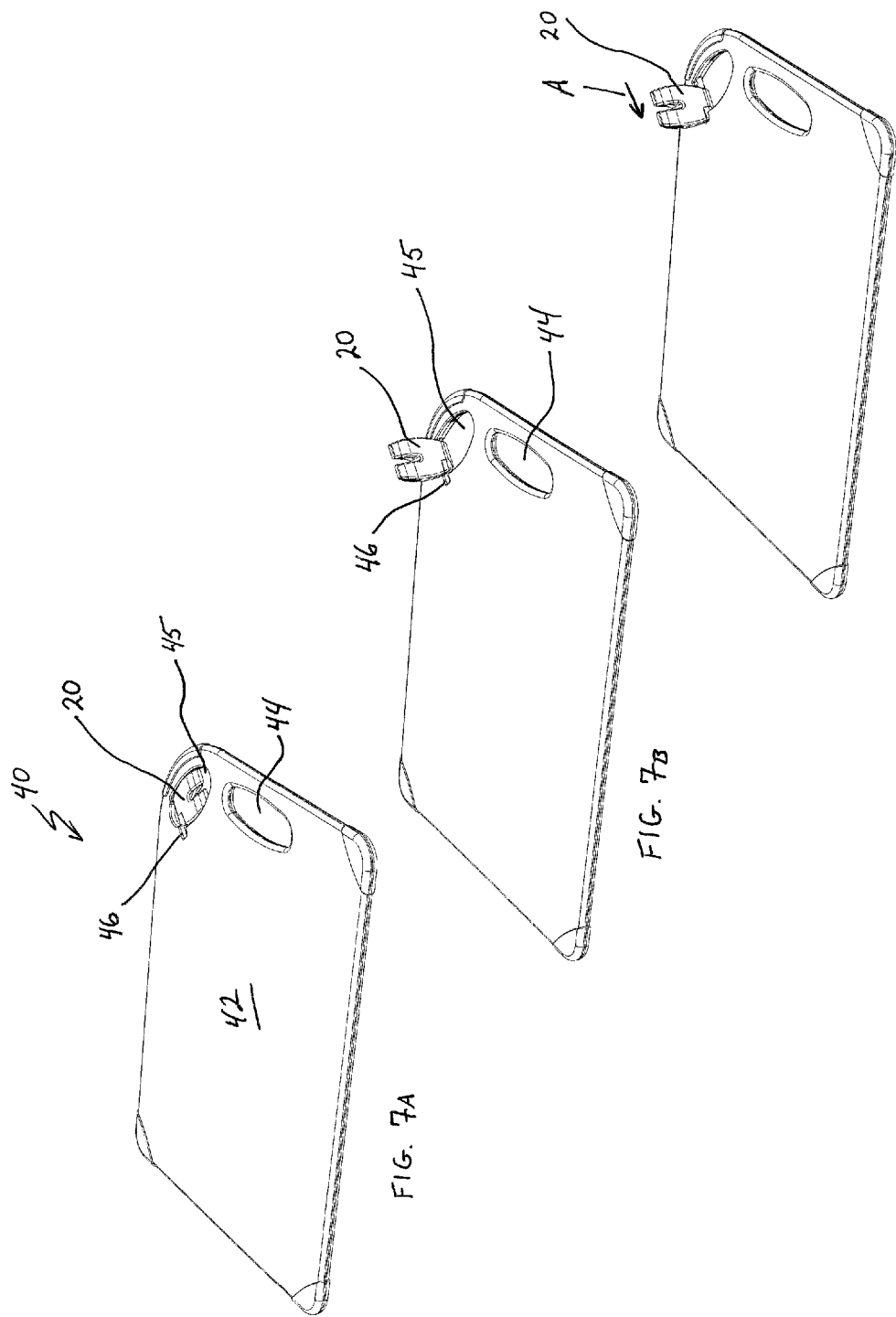

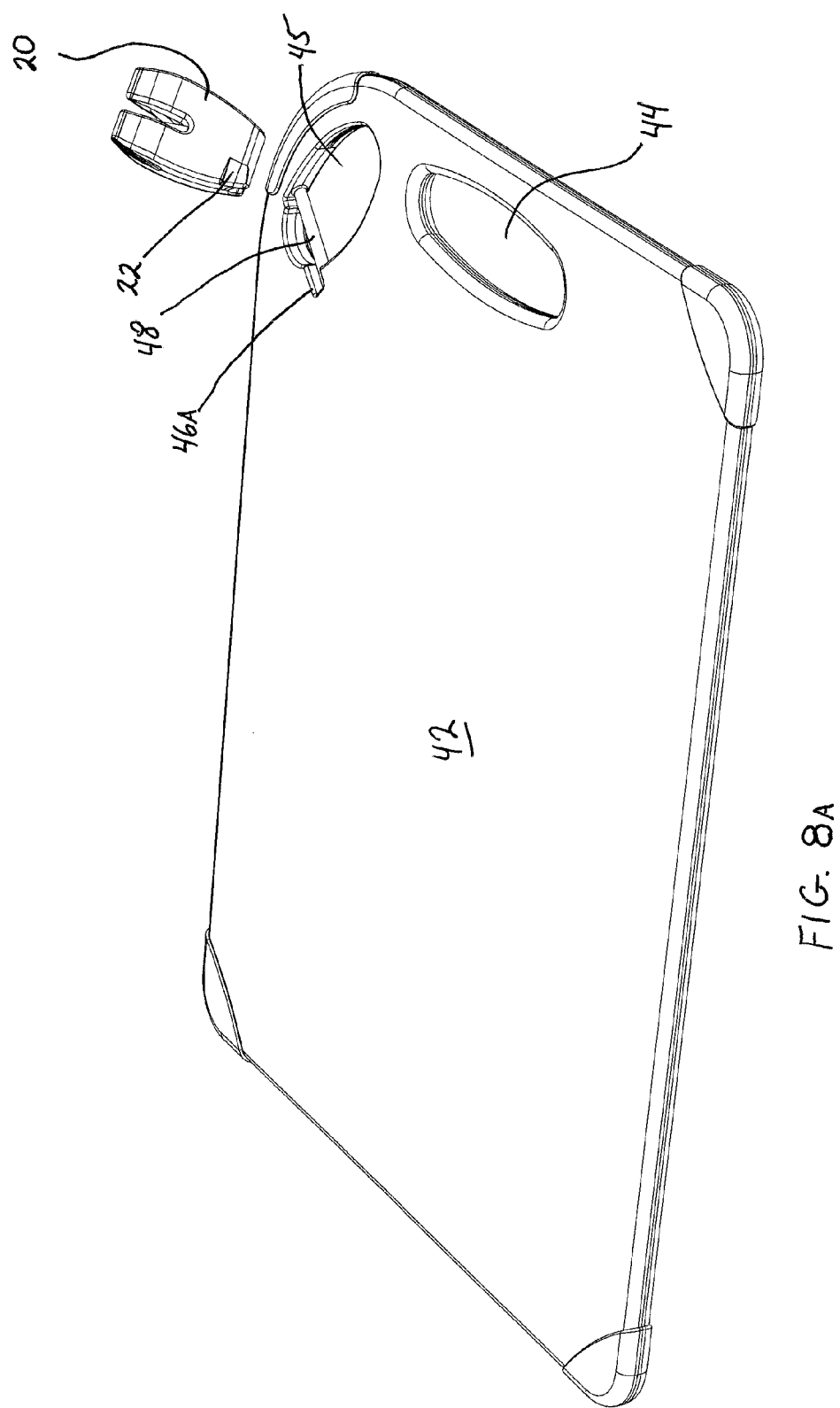

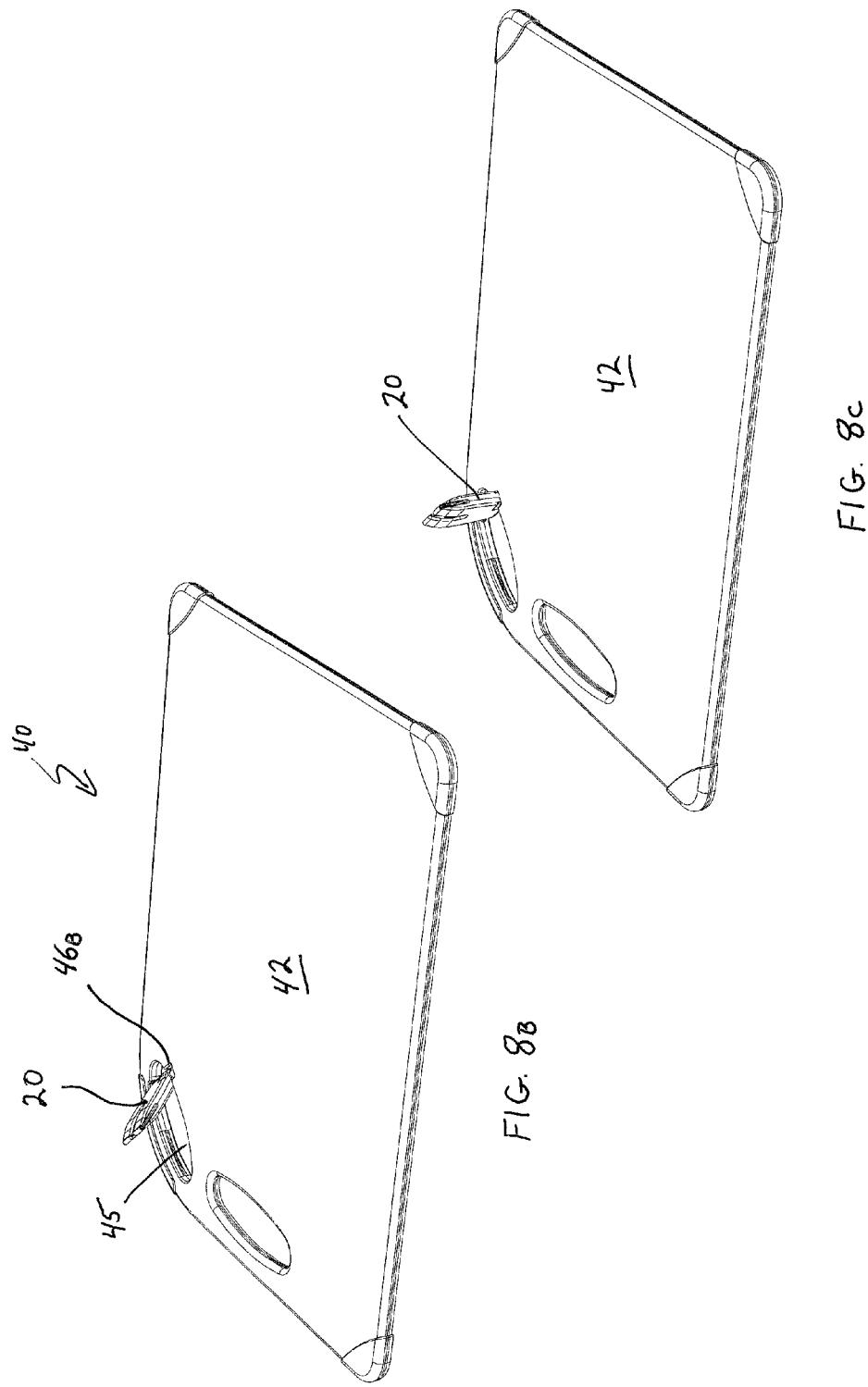

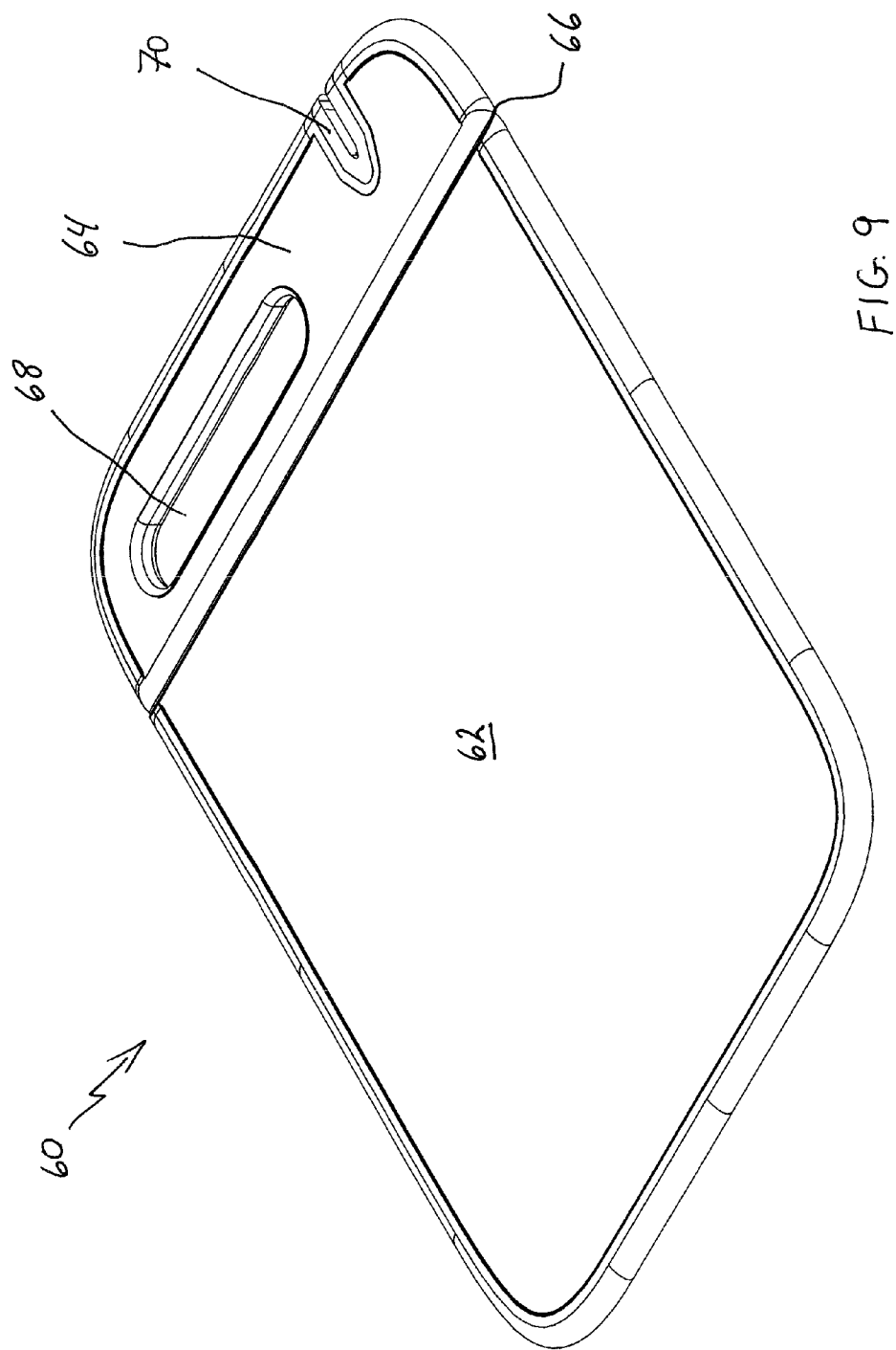

CUTTING BOARD WITH INTEGRATED KNIFE SHARPENER

BACKGROUND

1. Technical Field

The present principles relate to cutting boards. More particularly, it relates to a cutting board having an integrated knife sharpener.

2. Discussion of Related Art

Cutting boards having knife sharpeners are known. Present designs of such cutting boards require the knife sharpener to be either part of the handle or part of the board itself. In each of these instances, in order to use the knife sharpener properly, the user must hold the board upright. This means that any food items on the cutting board must be removed first, or alternatively, the knife sharpener used prior to using the cutting board surface. Thus, if the user's knife needs sharpening while cutting food on the cutting surface of the board, the food would need to be removed from the cutting surface before the same could be used. Another drawback of the known cutting boards with knife sharpeners is that they are designed specifically for either a right handed or left handed user, and cannot be configured to accommodate both.

Thus, there is a need for a new and improved integration of a knife sharpener that not only overcomes the above-noted shortfalls of the known art, but is user reconfigurable to accommodate as user's preferred hand of operation.

SUMMARY

According to an implementation, the cutting board includes an opening passing through the same, and a knife sharpener rotatably disposed within the opening and having a first folded storage position and a second upright operable position.

According to another implementation, the cutting board includes an opening passing through the same. The opening has a rod positioned therein. A knife sharpener is connected to the rod and being rotatably disposed within the opening on the rod. The knife sharpener has a first folded storage position within the opening and a second upright operable position. A securing mechanism is integrated into both the opening and the knife sharpener for securing the knife sharpener in the second operable position.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which:

FIGS. 7A-7C show the cutting board with integrated knife sharpener, according to yet another embodiment of the present principles;

FIG. 8A is perspective view of the cutting board of FIG. 7 showing the removal of the knife sharpener, according to an embodiment of the present principles;

FIGS. 8B and 8C show the cutting board of FIG. 8A upside down and the implementation of the knife sharpener therein, according to an embodiment of the present principles;

FIG. 9 is a perspective view of the cutting board with integrated sharpener, according to another embodiment of the present principles.

DETAILED DESCRIPTION

The present principles are directed to cutting boards having integrated knife sharpeners.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Reference in the specification to "one embodiment" or "an embodiment" or "an implementation" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As noted above, the present principles relate to cutting boards with integrated knife sharpeners. According to one implementation, the knife sharpeners are configured to be folded from a first storage position flush with the cutting board surface to a second upright operable position. When folded into the first storage position, the knife sharpener cannot be used. A securing mechanism is included which enables the sharpener to be accurately positioned and secured in the second upright operable position.

Figure 1:
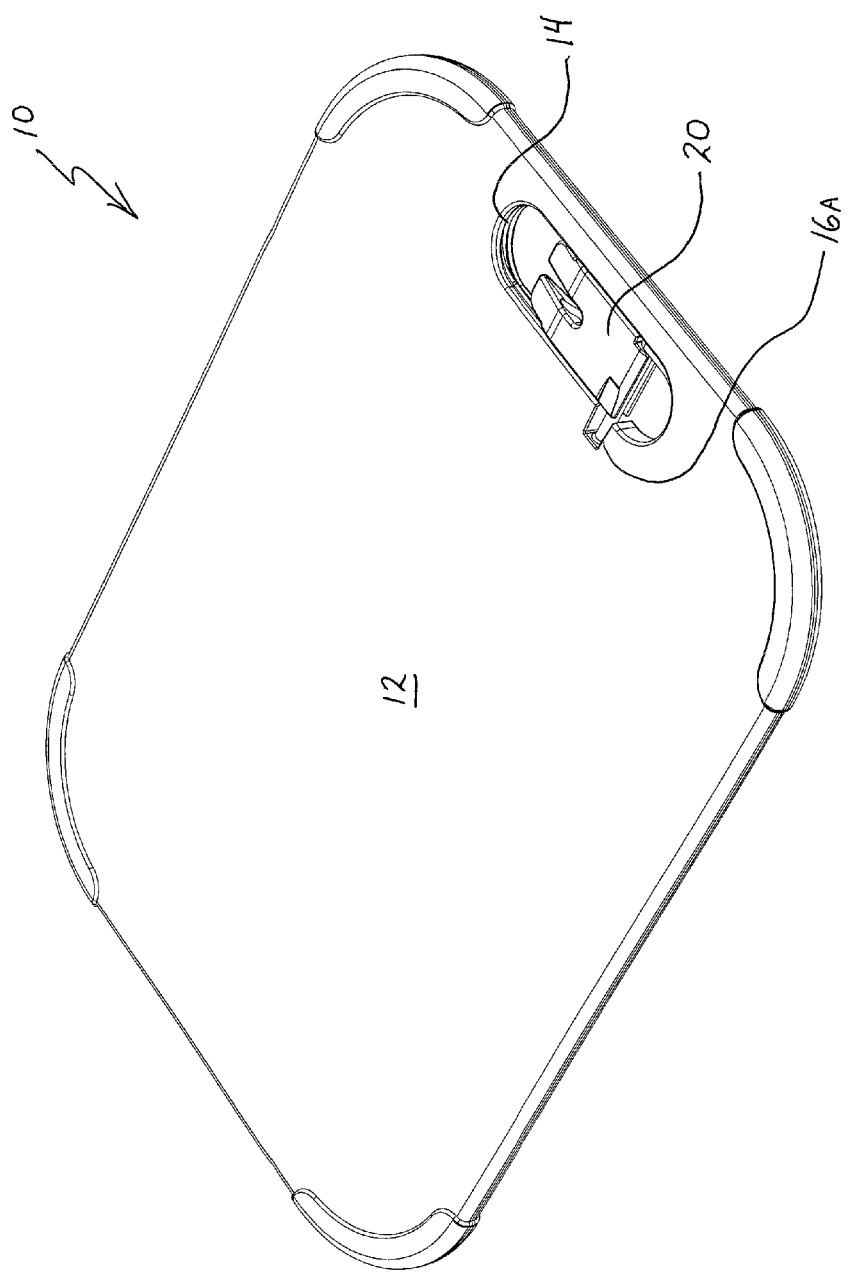
FIG. 1 is a perspective view of the cutting board with integrated sharpener in a folded storage position according to embodiment of the present principles.
Figure 2:
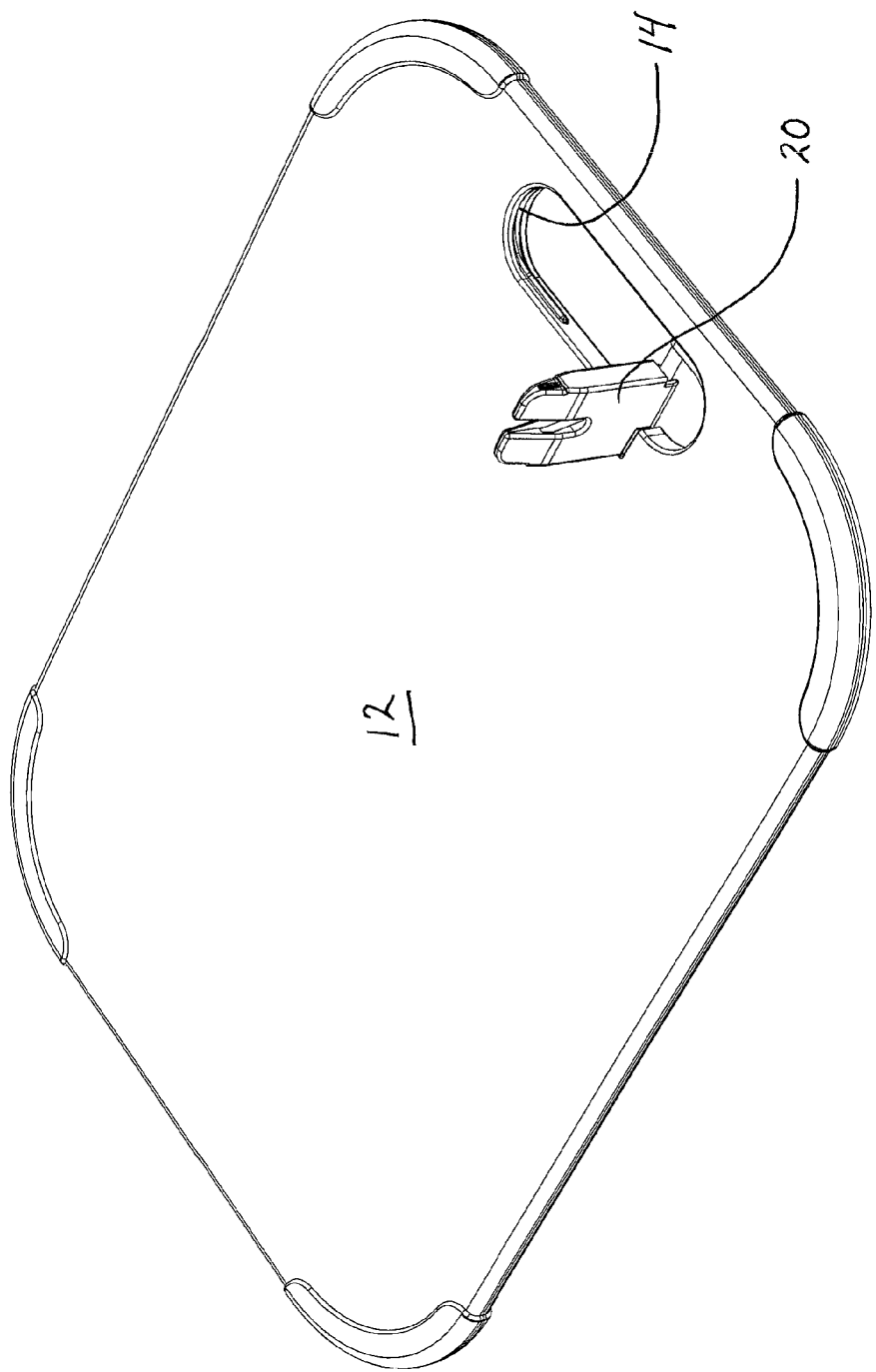
FIG. 2 is a perspective view of the cutting board with integrated sharpener in its upright usable position, according to an embodiment of the present principles.
Figure 3:
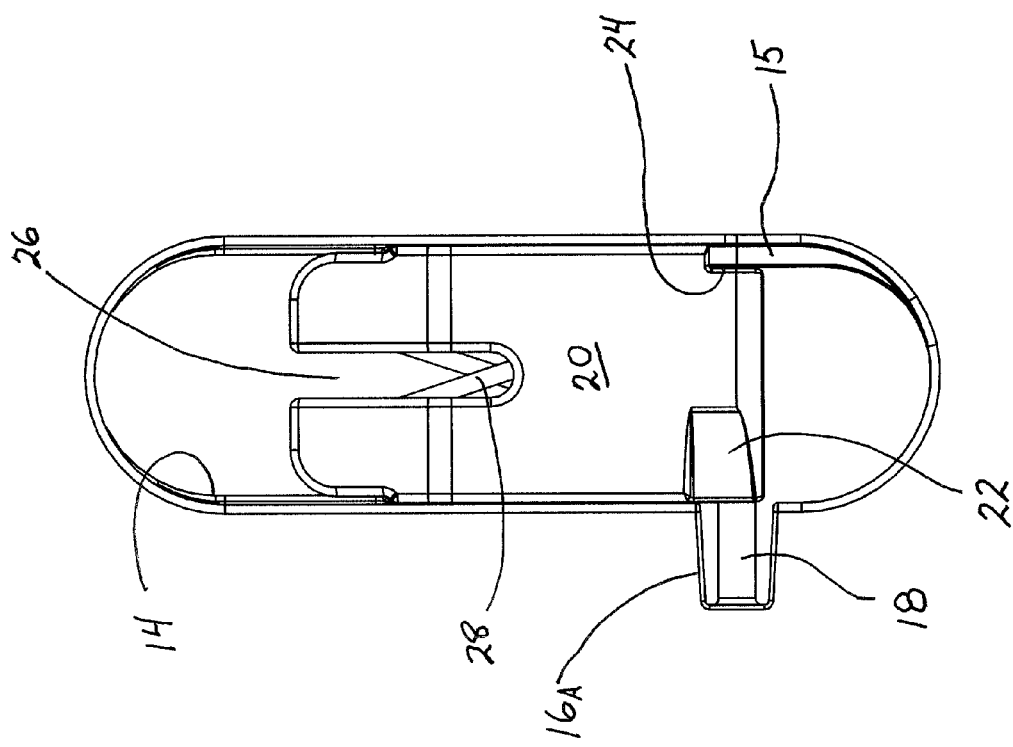
FIG. 3 is an enlarged view of the knife sharpener shown in FIG. 1, according to an embodiment of the present principles.
Figure 4:
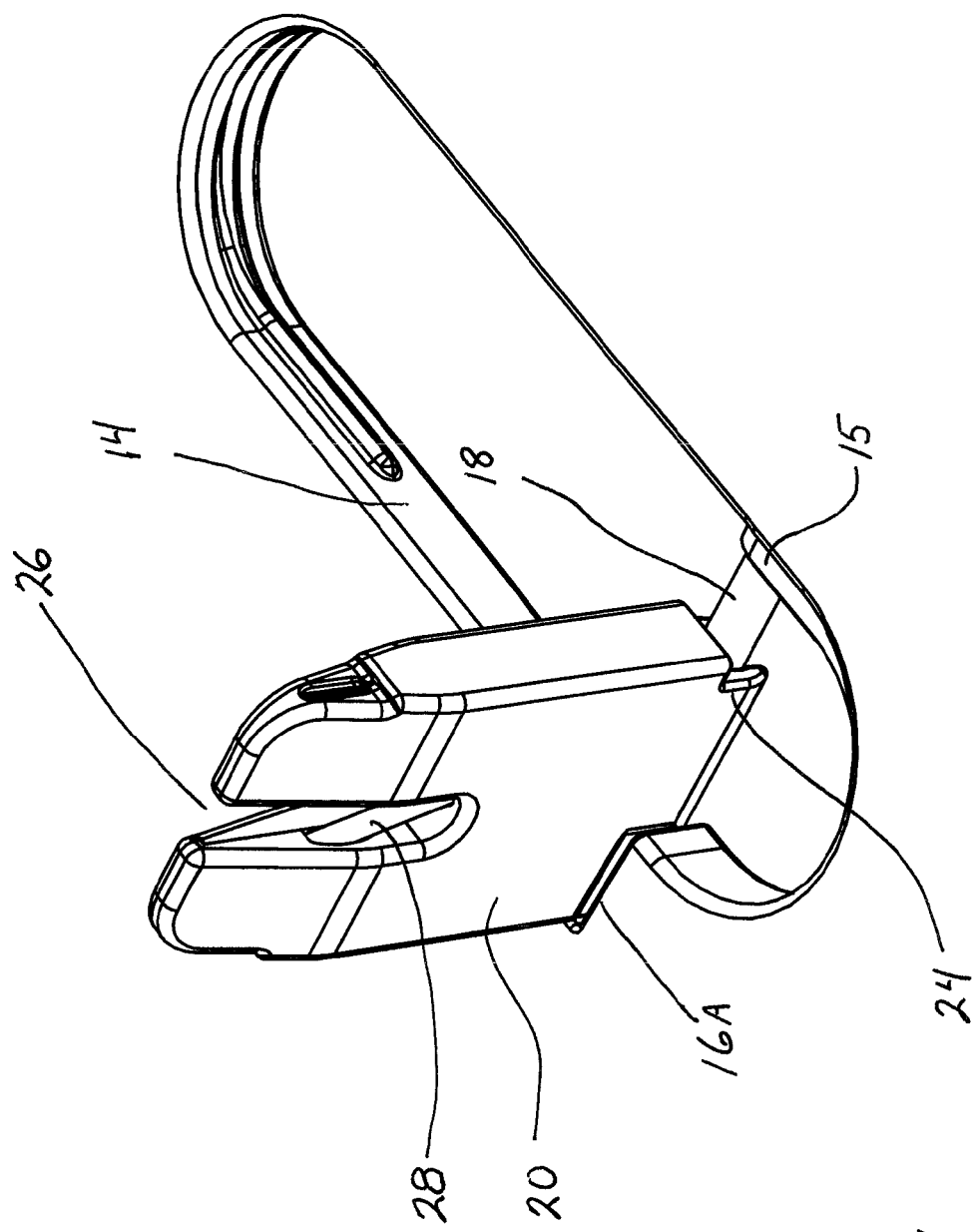
FIG. 4 is an enlarged view of the knife sharpener shown in FIG. 2, according to an embodiment of the present principles.

FIG. 1 shows the cutting board 10 having a cutting surface 12, and a handle opening 14. The sharpener 20 is positioned within the handle opening 14 and is shown in the first storage position. FIG. 2 shows the cutting board 10 with the sharpener 20 in its second upright operable position.

Referring to FIGS. 3, 4 and 6A-6E, the operation and integration of the sharpener 20 will be described. In the embodiments of FIGS. 1 and 2, the board includes a handle shaped opening 14. This opening includes an extension or slot 16 that is transverse to the opening 14 and is configured to accommodate one end of a rod 18 that is integrally molded with the board. As will be described in more detail below, extension 16 is shown as 16A on one side and 16B on the other side. Opening 14 further includes a shoulder 15 that retains the other end of rod 18. Shoulder 15 has two functions: one is to substantially secure the sharpener 20 in the first storage position; and the second is to prevent sharpener 20 from being rotated beyond a desired (i.e., substantially perpendicular or transverse) position with respect to the opening 14 so that the same can be slid into the extension/slot 16 and secured for operation.

Sharpener 20 includes a blade receiving slot 26 with sharpening stones or material 28 positioned therein. At the base of the sharpener 20, a slot 38 is provided which is configured to allow the sharpener to be "snapped" onto the rod 18 in the board. On one side of the bottom of sharpener 20 is positioned a notch 24. This notch is configured such that when sharpener 20 is lifted from the first storage position, the notch will engage the shoulder 15 and thereby prevent the sharpener from being rotated beyond a desired 90 degrees. On the other side of the bottom of sharpener 20 (i.e., opposite notch 24) is a slot 22. When the sharpener 20 is lifted from the first storage position to the upright 90 degree position (caused or limited by notch 24 engaging shoulder 15), the sharpener is then slid along rod 18 such that slot 22 engages or is received into extension 16 (See FIG. 4). Once positioned within extension 16, the sharpener is secured in an upright position transverse to the cutting surface of the board, and can be used as needed.

Figure 5:
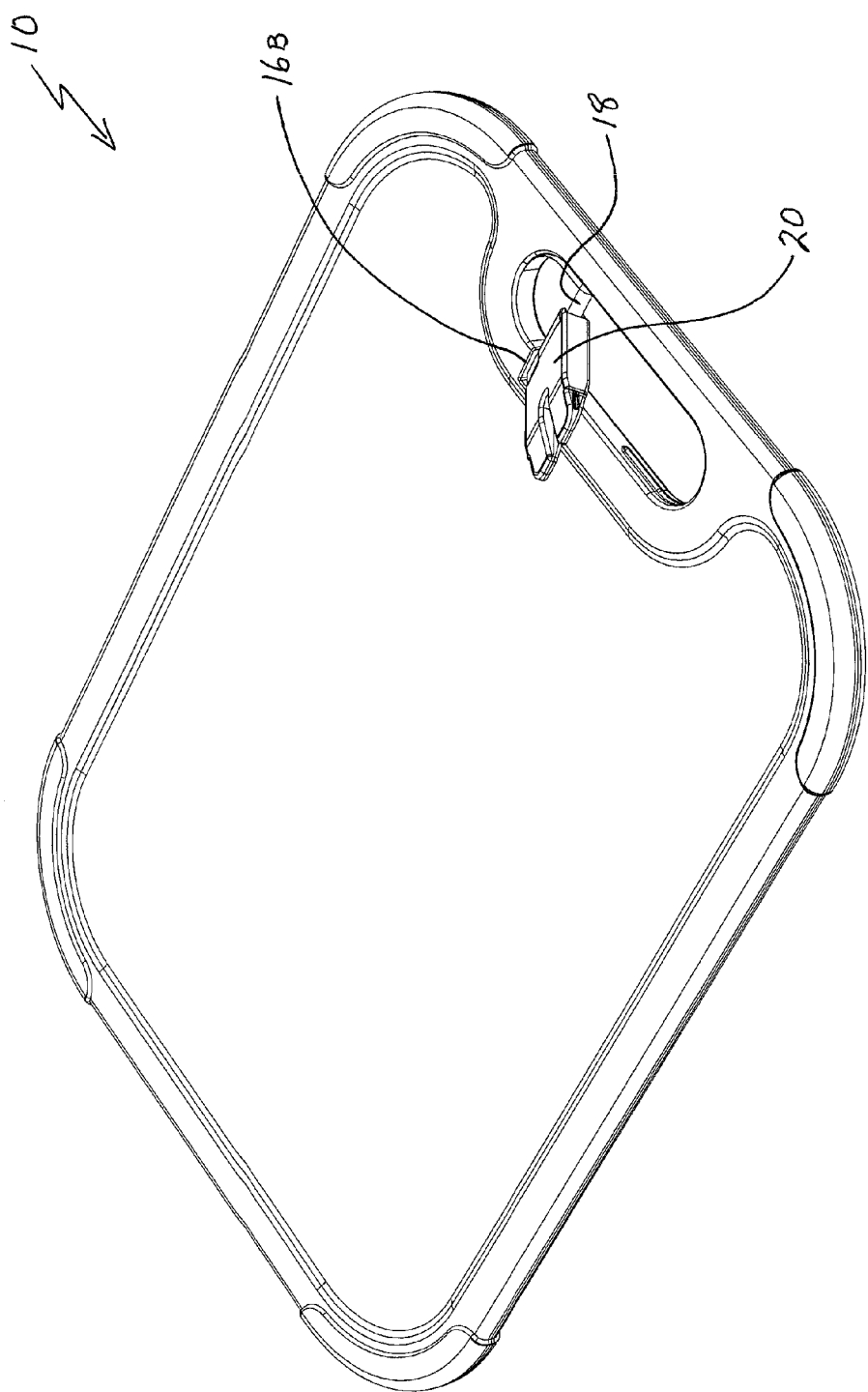
FIG. 5 is a perspective view of the cutting board of FIG. 1 upside down and showing the implementation of the knife sharpener, according to another embodiment of the present principles.
Figure 6E:
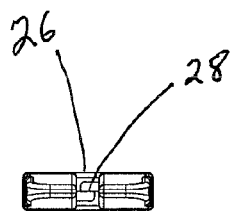
FIGS. 6A-6E show various views of the knife sharpener, according to an embodiment of the present principles.
Figure 6B:
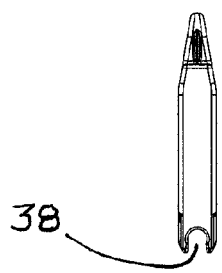
Figure 6A:
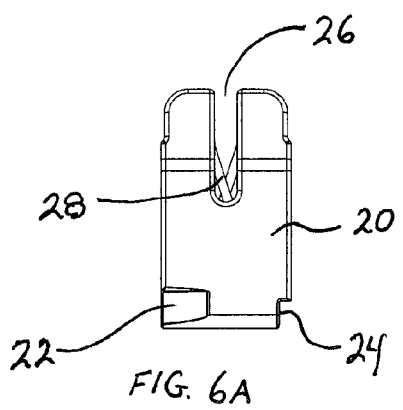
Figure 6C:
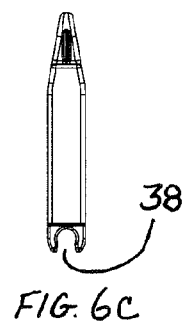
Figure 6D:
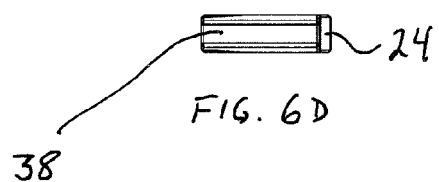

Referring to FIG. 5, there is shown the board 10 turned upside down. In this implementation, the slot 38 of the sharpener 20 is unsnapped from rod 18, and the board is turned over. The sharpener 20 is then snapped back onto rod 18, and operates the same way as described above. In this manner, the sharpener 20 with cutting board 10 can be configured to provide several advantages. For example, to accommodate either left handed or right handed individuals, for ease in manufacturing, and ease in replacing the sharpener in the event the same breaks.

In another desirable alternative implementation, rather than being snapped off the rod 18, sharpener 20 can remain positioned on the rod 18 and be simply be pushed through the opening so that it can be used on the other side of the board.

FIGS. 6A-6E show the sharpener 20 according to a preferred implementation of the present principles. Sharpener 20 has a knife receiving slot 26 that has sharpening elements 28 disposed therein. Sharpening elements 28 can be made from, for example, carbon steel, carbide, ceramic, diamond coated steel, and/or any other suitable knife sharpening materials, and can be arranged in any suitable type of configuration to impart a desired sharpening edge to a blade (e.g., specific angles, etc.).

Along the bottom of sharpener 20 is a slot 38 that is configured to snap fit onto and be removed from the rod 18 described with reference to FIGS. 1-5. Also as described above, the slot 22 is configured to slidably engage the extension 16 in the associated opening so as to secure the sharpener in the upright, operable perpendicular position for use. The notch 24 engages the shoulder 15 in the board opening so as to prevent the sharpener from being rotated beyond 90 degrees, and further operates to align the slot 22 with the extension 16.

FIGS. 7A-8C show another implementation of a cutting board 40 with an integrated sharpener according to the present principles. In this implementation, cutting board 40 has a handle opening 44 and a separate knife sharpener opening 45. The first folded storage position (FIG. 7A) and the second upright operable position (FIG. 7C) are achieved in the same manner as that described above with respect to the embodiments of FIGS. 1-5. As shown in FIG. 8A, the sharpener 20 can be unsnapped from rod 48, and repositioned on the same when the board 42 has been turned upside down. FIGS. 8B and 8C show the implementation of the sharpener 20 in opening 45 when the board is upside down. The slot 46A (as shown on upper side) and 46B as shown on the underside are the same slot and operates as previously described to secure sharpener 20 in the upright operable position.

Figure 10:
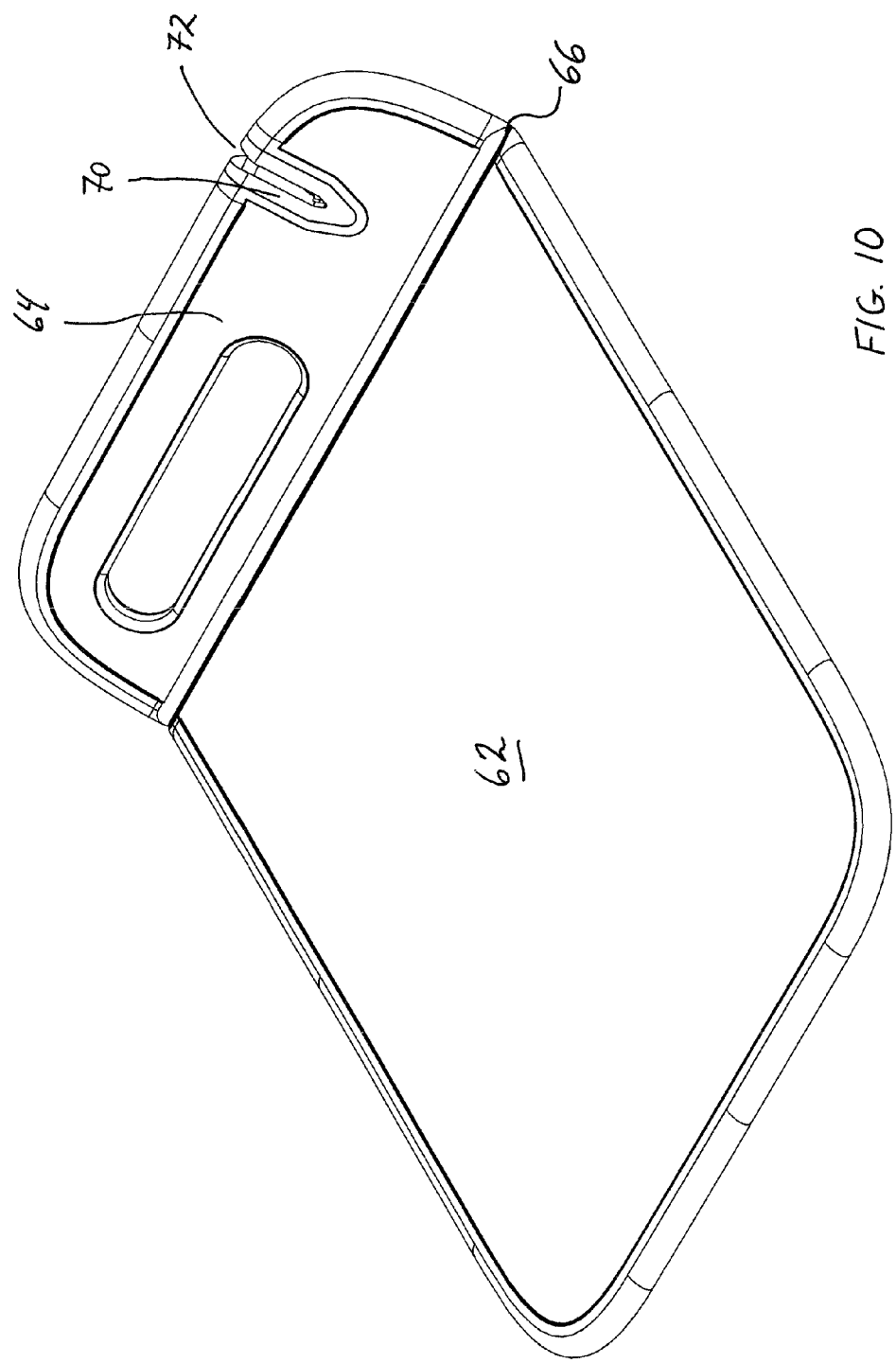
FIG. 10 is a perspective view of the cutting board with integrated sharpener of FIG. 9 showing the operable position for the same, according to an embodiment of the present principles.

FIGS. 9-10 show an alternative implementation of a cutting board 60 with integrated sharpener 70. In this implementation, the cutting board 60 has a cutting surface 62 that is separated from a non-cutting surface portion 64. The non-cutting surface portion includes a handle opening 68 and sharpener 70 embedded therein such that the blade receiving slot 72 is accessible from that end of the board.

A hinge or living hinge 66 separates the cutting surface 62 from the non-cutting surface portion 64. In this manner, the non-cutting surface portion 64 and thereby the sharpener 70 can be brought into a substantially upright position to enable easy access and use of the sharpener.

In one implementation, hinge 66 allows non-cutting portion 64 to be pivoted such that the same is positioned in a desired angle for use of the same. An example of the operable inner angle range between non-cutting portion 64 and cutting surface 62 would be 70-90 degrees. In other implementations, a locking or securing mechanism can be provided which would operate to releasable secure the non-cutting portion 64 in the upright operable position.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

What is claimed is:

1. A cutting board having edges and comprising:
    an opening positioned inside the edges and passing through the cutting board;
    a knife sharpener rotatably disposed within the opening and having a first folded storage position and a second upright position; and
    a securing mechanism integrated into both the opening and knife sharpener for securing the knife sharpener in one of the first storage position or second upright position.

2. The cutting board according to claim 1, wherein said securing mechanism for securing the knife sharpener in the first storage position comprises:
    a notch on a bottom of the knife sharpener; and a shoulder positioned in said opening, wherein said notch frictionally passes over said shoulder and thereby retains the knife sharpener in the first storage position.

3. The cutting board according to claim 1, wherein said securing mechanism for securing the knife sharpener in the second position comprises:
  a transverse slot extending outward from the opening;
  a notch in the knife sharpener, said notch being aligned with the transverse slot when the knife sharpener is moved to an upright position;
  wherein the notch of the knife sharpener slidably engages the transverse slot and thereby secures the knife sharpener in the second upright position.

4. The cutting board according to claim 1, wherein said opening further comprises:
  a slotted extension;
  a shoulder opposite the slotted extension; and
  a rod having one end positioned in the slotted extension and a second end extending across the opening to the shoulder.

5. The cutting board according to claim 4, wherein the knife sharpener is rotatable on said rod such that the sharpener can be pushed through the opening and used on an opposite side of the cutting board.

6. The cutting board according to claim 1, wherein said opening is a handle opening for the cutting board.

7. The cutting board according to claim 1, wherein said opening is separate and distinct from a handle opening of the cutting board.

8. The cutting board according to claim 1, further comprising a restraining mechanism configured to prevent the sharpener from being over rotated beyond the second upright position, said restraining mechanism comprising:
  a notch on a bottom of the knife sharpener; and
  a shoulder positioned in said opening, wherein said shoulder engages said notch and prevents further rotation of the sharpener when the sharpener has been rotated into the second upright position.

9. A cutting board comprising:
  an opening passing through the cutting board, said opening having a rod positioned therein, said opening being a handle opening for the cutting board;
  a knife sharpener connected to said rod and being rotatably disposed within the opening, the knife sharpener having a first folded storage position within the opening and a second position;
  a securing mechanism integrated into both the opening and the knife sharpener for securing the knife sharpener in the second position; and
  a restraining mechanism configured to prevent the sharpener from being over rotated beyond the second upright position.

10. The cutting board of claim 9, wherein said restraining mechanism comprises:
  a notch on a bottom of the knife sharpener; and
  a shoulder positioned in said opening, wherein said shoulder engages said notch and prevents further rotation of the sharpener when the sharpener has been rotated into the second upright position.

11. The cutting board according to claim 9, wherein said securing mechanism for securing the knife sharpener in the first storage position comprises:
  a notch on a bottom of the knife sharpener; and
  a shoulder positioned in said opening, wherein said notch frictionally passes over said shoulder and thereby retains the knife sharpener in the first storage position.

12. The cutting board according to claim 9, wherein said securing mechanism for securing the knife sharpener in the second position comprises:
  a transverse slot extending outward from the opening;
  a notch in the knife sharpener, said notch being aligned with the transverse slot when the knife sharpener is moved to an upright position;
  wherein the notch of the knife sharpener slidably engages the transverse slot and thereby secures the knife sharpener in the second upright position.

13. The cutting board according to claim 9, wherein said opening further comprises:
  a slotted extension;
  a shoulder opposite the slotted extension; and
  a rod having one end positioned in the slotted extension and a second end extending across the opening to the shoulder.

14. A cutting board comprising:
  an opening passing through the cutting board, said opening having a rod positioned therein, said opening being separate and distinct from a handle opening of the cutting board;
  a knife sharpener connected to said rod and being rotatably disposed within the opening, the knife sharpener having a first folded storage position within the opening and a second position; and
  a securing mechanism integrated into both the opening and the knife sharpener for securing the knife sharpener in the second position.

15. The cutting board of claim 14, further comprising a restraining mechanism configured to prevent the sharpener from being over rotated beyond the second upright position, said restraining mechanism comprises:
  a notch on a bottom of the knife sharpener; and
  a shoulder positioned in said opening, wherein said shoulder engages said notch and prevents further rotation of the sharpener when the sharpener has been rotated into the second upright position.

16. The cutting board according to claim 14, wherein said securing mechanism for securing the knife sharpener in the first storage position comprises:
  a notch on a bottom of the knife sharpener; and
  a shoulder positioned in said opening, wherein said notch frictionally passes over said shoulder and thereby retains the knife sharpener in the first storage position.

17. The cutting board according to claim 14, wherein said securing mechanism for securing the knife sharpener in the second position comprises:
  a transverse slot extending outward from the opening;
  a notch in the knife sharpener, said notch being aligned with the transverse slot when the knife sharpener is moved to an upright position;
  wherein the notch of the knife sharpener slidably engages the transverse slot and thereby secures the knife sharpener in the second upright position.

18. The cutting board according to claim 14, wherein said opening further comprises:
  a slotted extension;
  a shoulder opposite the slotted extension; and
  a rod having one end positioned in the slotted extension and a second end extending across the opening to the shoulder.

* * * * *